United States Patent
Rose

(10) Patent No.: US 12,352,918 B2
(45) Date of Patent: Jul. 8, 2025

(54) SUPPRESSION OF INTERFERENCE IN THREAT DETECTION

(71) Applicant: Evolv Technologies, Inc., Waltham, MA (US)

(72) Inventor: Alec Rose, Waltham, MA (US)

(73) Assignee: Evolv Technologies, Inc., Waltham, MA (US)

( * ) Notice: Subject to any disclaimer, the term of this patent is extended or adjusted under 35 U.S.C. 154(b) by 373 days.

(21) Appl. No.: 17/899,017

(22) Filed: Aug. 30, 2022

(65) Prior Publication Data

US 2023/0071806 A1    Mar. 9, 2023

Related U.S. Application Data

(60) Provisional application No. 63/238,849, filed on Aug. 31, 2021.

(51) Int. Cl.
*G01V 3/10*    (2006.01)
(52) U.S. Cl.
CPC ............ *G01V 3/10* (2013.01); *G06V 2201/05* (2022.01)
(58) Field of Classification Search
CPC ....................................................... G01V 3/10
See application file for complete search history.

(56) References Cited

U.S. PATENT DOCUMENTS

| | | | |
|---|---|---|---|
| 2006/0284758 A1* | 12/2006 | Stilwell | G01S 13/888 340/552 |
| 2020/0133405 A1* | 4/2020 | Chan | G02B 27/0179 |
| 2020/0135004 A1* | 4/2020 | Ellenbogen | G07C 9/38 |

FOREIGN PATENT DOCUMENTS

| | | |
|---|---|---|
| WO | 2006114473 A1 | 11/2006 |
| WO | 2013109486 A1 | 7/2013 |
| WO | 2014172751 A1 | 10/2014 |
| WO | 2023034308 A1 | 3/2023 |

OTHER PUBLICATIONS

Makkonen et al. (2015) "Determination of Material and Geometric Properties of Metallic Objects Using the Magnetic Polarisability Tensor", IEEE Sensors Applications Symposium (Sas), 5 pages.

* cited by examiner

*Primary Examiner* — Hyun D Park
(74) *Attorney, Agent, or Firm* — Mintz Levin Cohn Ferris Glovsky and Popeo, P.C.

(57) ABSTRACT

A method includes receiving data characterizing a signal obtained by a plurality of magnetic field receivers, the signal formed of a combination of a first magnetic field, a second magnetic field resulting from interaction of the first magnetic field and a first object, and a third signal resulting from motion of receivers within the first magnetic field and/or an external magnetic field other than the first magnetic field. The method also includes determining a component of the signal characterizing a contribution of the second magnetic field to the signal by multiplying the received data by a mapping that characterizes the contributions of the third signal to the signal to cancel the contributions of the third signal. The method further includes providing the determined component of the signal characterizing the contribution of the second field to the signal. Related systems and computer program products are also provided.

16 Claims, 6 Drawing Sheets

SUPPRESSION OF INTERFERENCE IN THREAT DETECTION

CROSS-REFERENCE TO RELATED APPLICATIONS

The present application claims priority under 35 U.S.C. § 119 to U.S. Provisional Application No. 63/238,849 entitled "Suppression of Interference in Threat Detection" filed on Aug. 31, 2022, which is hereby expressly incorporated by reference in its entirety.

TECHNICAL FIELD

The subject matter described herein relates to a personnel inspection system, which in some example implementations, can be capable of performing threat detection and discrimination without personal item divestment.

BACKGROUND

Airport security attempts to prevent any threats or potentially dangerous situations from arising or entering the country. Some existing radio frequency (RF) imaging systems (such as those utilized by airport security for passenger screening) are large, expensive, and require individuals to remain stationary while an antenna rotates around the stationary individual to capture an image. In addition, these existing RF imaging systems can require divestment of personal items such as cell phones, keys, wallets, and the like, by the individual under inspection. Such divestment requirement can reduce throughput and usability of the imaging systems.

Some existing inspection systems, such as walkthrough metal detectors, can include coils to generate and measure changes in a magnetic field caused by magnetic or conductive materials (e.g., metallic) passing through the magnetic field. These existing inspection systems can be capable of measuring for metallic objects passing through a threshold but can lack any ability to distinguish personal items such as a cell phone, laptop, keys, belt buckle, and the like from threats, such as fire arms or improvised explosive devices. Accordingly, these example existing inspection systems require divestment of personal items thereby limiting their throughput and usability.

SUMMARY

Various aspects of the disclosed subject matter may provide one or more of the following capabilities.

In some implementations, a method includes receiving data characterizing a signal obtained by a plurality of magnetic field receivers, the signal formed of a combination of a first magnetic field, a second magnetic field resulting from interaction of the first magnetic field and a first object, and a third signal resulting from motion of receivers within the first magnetic field and/or an external magnetic field other than the first magnetic field. The external magnetic field is generated by an external source. The method also includes determining a component of the signal characterizing a contribution of the second magnetic field to the signal. Determining the component includes at least multiplying the received data by a mapping that characterizes the contributions of the third signal to the signal to cancel the contributions of the third signal. The method further includes providing the determined component of the signal characterizing the contribution of the second field to the signal.

One or more of the following features can be included in any feasible combination.

In some implementations, the determining includes transforming the received data characterizing the signal from a first basis to a second basis. The determining also includes modifying the transformed data to generate modified data by at least cancelling portions of the transformed data corresponding to projections of the transformed data on a predetermined basis vector indicative of magnetic field generated by the second object. The determining further includes transforming the modified data from the second basis to the first basis.

In some implementations, the method further includes calculating a first matrix indicative of magnetic field measurements associated with magnetic fields generated by the external source in the absence of the first magnetic field; and performing singular value decomposition on the first matrix to generate a second matrix comprising a plurality of left singular vectors of the first matrix and a third matrix including singular values associated with the first matrix in the diagonal of the third matrix.

In some implementations, transforming the received data from the first basis to the second basis includes multiplying the received data by the second matrix. In some implementations, the method further includes generating a fourth matrix by at least setting a first singular value in the diagonal of the third matrix that is equal to or greater than a predetermined value to a zero, and by setting a second singular value in the diagonal of the third matrix that is less than the predetermined value to a one. A first left singular vector of the plurality of left singular vectors is associated with the first singular value, and the predetermined basis vector indicative of magnetic field generated by the second object includes the first left singular vector.

In some implementations, modifying the transformed data includes multiplying the result of the multiplication between the received data and the second matrix with the fourth matrix. In some implementations, transforming the modified data from the second basis to the first basis includes multiplying the modified data with the transpose of the second matrix. In some implementations, the method further includes calculating a polarizability index of the target object from the determined component of the signal characterizing the contribution of the second field to the signal. The polarizability index characterizes a magnetic polarizability property of the target object.

In some implementations, the method further includes calculating a fifth matrix indicative of magnetic field measurements resulting from rotation of one or more of the plurality of magnetic field receivers about a predetermined axis. A matrix element of the fifth matrix associated with a first magnetic field receiver is calculated by at least multiplying an angular displacement of the first magnetic field receiver with a predetermined expansion of a mode of the first magnetic field receiver associated with the angular displacement. In some implementations, the first object is a target object being inspected and second object is a stationary interference object.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Inspection systems based on magnetic field detection can be used to detect target objects (e.g., objects indicative of a potential threat). Such inspection systems can be placed in an environment (e.g., courthouse, airports, and the like) that can include objects that can interfere in the detection of the target objects. These objects, sometimes referred to as interference objects, can generate an interference signal that can obscure the signal from the target object. For example, the target object can generate a target magnetic field signal in response to a primary magnetic field generated by the inspection system that can be detected by the inspection system. An interference magnetic field can be generated by the interference object (e.g., by a current-carrying object generating a magnetic field independent of the inspection system) and may also be detected by the inspection system. The interference magnetic field can impede the detection of the target object by the inspection system. Some implementations of the current subject matter can enable suppressing the interference signal from the interference object resulting in the improvement in the identification of the target object.

In some implementations, suppressing the interference signal can include performing magnetic field measurements of the environment of the inspection system that includes the interference object in the absence of a magnetic field from the inspection system. These measurements can be referred to as dark measurements because they are taken at a time that the inspection system is not transmitting magnetic fields. Data collected from the dark measurements can be analyzed (e.g., via singular value decomposition) and stored.

Inspection systems based on magnetic field detection can also suffer from apparent magnetic field disturbances caused by motion in the inspection system's transmitters and/or receivers. This motion can generate an interference signal that can obscure the signal from the target object. In some implementations, suppressing the motion-induced interference signal can include performing or simulating magnetic field measurements while the system's transmitters and/or receivers are in motion. Data collected or simulated during this motion can be analyzed (e.g., via singular value decomposition) and stored.

An inspection algorithm of the inspection system can be modified based on the dark measurement data and/or the motion measurement data and stored (e.g., prior to the inspection of the target object). During the inspection of the target object, the signal from the target object can be transformed based on the dark measurement data and/or motion measurement data, and properties of the target object (e.g., polarizability of the target object) can be retrieved using the modified inspection algorithm.

Figure 1:
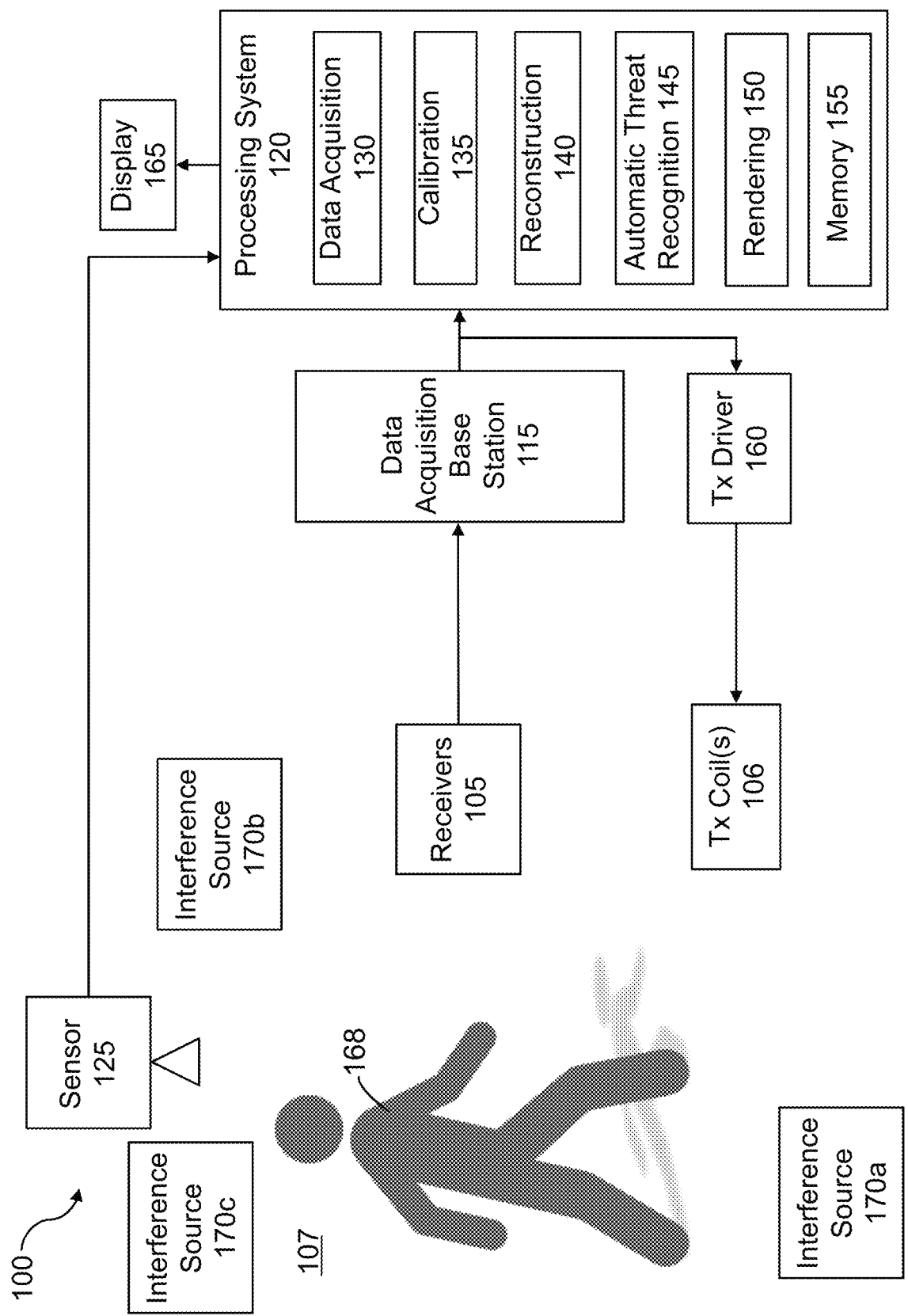
FIG. 1 is a system block diagram of an example inspection system that can be capable of performing threat detection in the presence of external interference.

An example inspection system will now be described. FIG. 1 is a system block diagram of an example inspection system 100 that can be capable of suppressing (e.g., removing) external interference that can impact the detection of the inspection system 100. As shown in FIG. 1, the system 100 includes magnetic receivers 105 coupled to a data acquisition base station 115. The data acquisition base station 115 can be configured to filter, demodulate, and digitize the magnetic field measurement data received from the receivers 105. The transmitters 106 and magnetic receivers 105 can be arranged to probe an observational domain (OD) 107, sometimes referred to as a "scene", such as a threshold or other defined region. The OD can include a target object 168 and multiple inference sources 170a-c. One or more of the interference sources 170a-c can interfere with the inspection of the target object 168 (e.g., by ob). The interference sources (e.g., electronic appliances, power lines, etc.) can, for example, obscure the signal from the target object 168.

The OD 107 can be considered to include voxels defining a volume. The OD 107 can be a single continuous region or multiple separate regions. The system 100 also include transmitters 106 coupled to a transmission driver 160. The transmission driver 160 can be configured to generate a signal to drive transmitters 106. The system 100 also includes a processing system 120 configured to analyze the received magnetic field measurements. The processing system 120 includes a data acquisition module 130, a calibration module 135, a reconstruction module 140, an automatic threat recognition module 145, a rendering module 150, and a memory 155. The system 100 can also include a display 165 for providing output; and a sensor 125 to provide additional inputs to the system 100.

In some implementations, the system can be configured to operate as a distributed lock-in amplifier, utilizing a synchronous homodyne digital dual-phase demodulation technique to accurately extract in-phase (I) and quadrature (Q) information from the system's specific transmitted frequencies. Demodulation can be achieved by digitally mixing or multiplying the desired signal with a reference signal and subsequently filtering the result using a low-pass filter. The reference signal can be a directly measured signal related to or derived from the driving signal used in the transmitter, or can be a synthetic analogue. By utilizing two versions of the reference signal, one phase shifted or time-delayed from the other, the amplitude, phase, and/or I and Q of the measured signal can be reconstructed.

In some implementations, the transmission driver 160 can include a combined set of digitally-controlled high-accuracy direct digital synthesis (DDS) waveform generators, a digitally-controlled summing programmable-gain amplifier (PGA) circuit, and a closed-loop class-D power amplifier with enhanced power supply rejection ratio (PSRR). Such a system provides flexibility in the frequency and amplitude of the transmitted waveforms while achieving high stability in the transmitted magnetic fields required to meet necessary signal-to-noise ratios in the measured data. The system 100 can digitally control an amplitude and a frequency of the transmitted magnetic fields. Digitally controlling the amplitude and the frequency of the transmitted magnetic field can be performed in a dynamic manner and in an arbitrary or ad-hoc manner. In some implementations, the system can include a closed-loop microcontroller-based feedback system configured to measure and dynamically adjust the per-frequency amplitude of the transmitted field thereby increasing the stability and predictability of the system.

Transmitters 106 can include at least two wire-loop transmitters capable of generating a magnetic field according to a driving signal having an operating (e.g., characteristic) frequency (e.g., a modulation frequency). The transmitters 106 can operate at 30 Hz and 130 Hz, for example. In general, a wire-loop can be considered to reside within a primary plane. In some implementations, the system 100 can include transmitters arranged to deliver fields with sufficient diversity to probe all cardinal directions (e.g., cartesian coordinates) throughout the OD 107. In a static system where objects under inspection are stationary, at least three transmitters can be included that are either oriented orthogonally (e.g., the primary plane of each of the three transmitters can be oriented orthogonal to one another), or else offset in space. If the object is undergoing motion in a particular direction, as in an object passing through the inspection system 100, two transmitters can be used if they are oriented orthogonal to the direction of motion or spatially offset transverse to both the direction of motion and their shared orientation. This configuration represents a reasonable constraint on object motion (e.g., in one direction) and can further represent the fewest number of transmitter coils capable of achieving sufficient field diversity to fully probe a given object.

As shown in FIG. 1, the transmitter driver 160 can generate one or more signals for driving the transmitters 106. In some implementations, the transmitters 106 can be driven by cycling through the transmitters in time, driving one, then another, until all desired measurements are captured. A benefit of such approach can include that the drive electronics can be shared across all of the transmitters 106. However, this approach can impose a duty-cycle on each transmitter 106, reducing its signal-to-noise ratio. In such a configuration, the transmitters 106 may not be measured at the same instant in time, which, if the object is in motion, may introduce motion-induced artifacts.

In some implementations, the transmitters 106 can be driven simultaneously, but at slightly (e.g., 10 Hertz (Hz)) offset frequencies. The frequencies can be offset enough such that they can be distinctly demodulated in post-processing, which can be set by the bandwidth necessary to resolve the object's motion, which can be about 5-10 Hz for objects moving at typical walking speeds of 1.3 meters per second (m/s). At the same time, the frequencies can be chosen to be similar enough that dispersion in the polarizability is negligible. In some implementations, the offset can be 10 Hz, which can be considered a negligible difference at all but vanishing frequencies. In this example frequency multiplexing approach, the transmit driver 160 can include separate drive electronics to drive each transmitter separately, which can enable improved signal-to-noise ratios without (and/or reducing) the risk of motion blur.

In some implementations, the transmission driver 160 can be capable of generating driving signals that can be distributed to transmitters 106, which can establish a fully phase coherent measurement system across all receive-transmit pairs. In addition, the driving signal can be provided as a reference signal routed from the transmitter driver 160 to the data acquisition base station 115, which can be utilized for demodulation, as described more fully below.

The magnetic receivers 105 can include flux gate sensors, which can directly measure the magnetic field (e.g., magnitude and phase) as compared to wire coils, which measure a rate of change of magnetic field. In some embodiments, one or more of the receivers 105 can include 3-axis flux gate magnetometers. In some embodiments, one or more of the receivers 105 can include 2-axis flux gate magnetometers. Flux gate magnetometers can be advantageous in that they can operate with high sensitivity, high linearity and a low noise floor as compared to coil receivers. The receivers 105 can provide accurate magnetic measurement at frequencies too low for traditional methods.

A flux gate sensor can measure the amplitude of a magnetic field in three axis (e.g., x, y, and z) at the location of the flux gate sensor. A flux gate sensor can include a sense coil surrounding an inner drive coil that is closely wound around a highly permeable core material, such as mu-metal. An alternating current can be applied to the drive winding, which can drive the core in a continuous repeating cycle of saturation and unsaturation. In the presence of an external magnetic field, with the core in a highly permeable state, such a field is locally attracted or gated through the sense winding. This continuous gating of the external field in and out of the sense winding induces a signal in the sense winding, whose principal frequency is twice that of the drive frequency, and whose strength and phase orientation vary directly with the external field magnitude and polarity.

In some implementations, flux gate sensors can be utilized with operating frequencies below 1 kHz, such as 130 Hz and 30 Hz. At these relatively low operating frequencies, flux gate sensors can operate with improved noise-floors, for example, some flux-gates can achieve a volt-to-field ratio on an order of 20 micro-Volts/nano-Tesla.

Data acquisition base station 115 can demodulate, filter, and digitize data received from receivers 105. The data acquisition base station 115 can aggregate the received data, determine in-phase and quadrature data (I and Q data, respectively) from the received and aggregated digitized data, and transmit the aggregated data as in-phase and quadrature data to processing system 120. Filtration and amplification of the raw magnetometer signals provided to the data acquisition module 130 allows the system to achieve high dynamic range in frequencies of interest, e.g., frequencies below 1 kHz, such as 130 Hz and 30 Hz, by rejecting large ambient direct current (DC) magnetic signals. The bandwidth and design of the filters used in the hardware and/or the software of the system 100 can be selected to reject unwanted signals in the environment, such as 50 and 60 Hz signals generated by alternating current (AC) lines, while maintaining sufficient bandwidth in the demodulated signal to recover the motion of the object.

Sensor 125 can include an infrared (IR) camera, thermal camera, ultrasonic distance sensor, video camera, electro-optical (EO) camera, and/or surface/depth map camera. Sensor 125 creates an additional information image or video, such as an optical image, of at least the OD 107. In some implementations, sensor 125 transmits images or video to processing system 120 for further analysis. System 100 can include multiple sensors 125. Sensor 125 can also be used to detect for the presence of a target in the OD 107. Detecting the presence of a target in the OD 107 can be used to trigger scanning by the system 100. In some implementations, sensor 125 can include a radio frequency identification (RFID) reader.

The system can also present an image to an operator via display 165 in which the visible portion of the visitor and/or their belongings most likely to contain the object(s) is segmented, highlighted, or otherwise made to provide notice to an operator and aid in the operator's response. In addition, aspects of the object can be determined based on the images obtained from the depth camera. The obtained aspects can be associated with classification of the object. For example, if the object is in plain view, the magnetic sensing algorithm can determine the object class, such as determining that the object is a laptop or an umbrella. If the object is concealed, the magnetic sensing algorithm can determine a part of the person's body or a location on the person where the object is concealed, such as a pocket of the person's clothing, an ankle or wrist of the person, or a bag that the person may be carrying. Data associated with these locations can be combined with information derived from the magnetic field data in a classification step that uses all available information to achieve greater predictive accuracy during threat detection.

Processing system 120 includes a number of modules for processing magnetic field data and additional information images from sensor 125 of the OD 107 including data acquisition module 130, calibration module 135, reconstruction module 140, automatic threat recognition module 145, rendering module 150, and a memory 155.

Data acquisition module 130 acquires a time-series of voltage measurements which represent magnetic field measurements from the DAS base station 115 and additional information images from the sensor 125. In some implementations, the sampling rate of the data acquisition module 130 is derived from the same master clock used to generate the transmitted fields via the transmitters 106. For each receiver 105, data acquisition module 130 derives I and Q data from this time-series in post-processing via demodulation with an accompanying reference signal. Timing of the I and Q data can be synchronized across receivers 105 and data acquisition module 130 can publish the synchronized data as frames (e.g., time slices) for further analysis by system 100.

In some implementations, the master clock of the system 100 can be distributed across multiple meters of space in the system, using an internal network of low-jitter low-skew clock fanouts and low voltage differential signaling (LVDS) converters. This configuration can enable a sampling rate to be an integer harmonic of every transmitted frequency, eliminating digitization errors which otherwise damage the sensitivity of the system. By configuring each device in the data acquisition process 130 on the same clock domain, receivers 105, which can be located meters apart, can be correctly assumed to be receiving samples at the same time intervals, with no drift due to frequency mismatching. Thus, for a given frame, data acquisition module 130 publishes a set of data for each receiver 105 and sensor 125. In some implementations, data can be acquired and frames can be published at a rate sufficient to resolve the carrier frequencies.

In some implementations, data acquisition module 130 the removes static background signal (e.g., the primary field). In some implementations, the data acquisition base station 115 can remove the static background signal (e.g., the primary field) such that the I and Q data characterizes the secondary field and not the primary field.

Calibration module 135 applies calibration correction to the published data. Calibration corrections can include compensating the published data for serial time-sampling. In addition, calibration module 135 can compare measured primary fields to one or more field model predictions, and compensate for any differences. In some implementations, calibration can account for amplitude and phase changes of the transmitters that occur due to normal wear and tear, manufacturing variations, or temperature changes.

Reconstruction module 140 transforms the calibrated data into images and/or feature maps. An image can be created for each receiver 105, and/or based on a composite of measurements obtained by multiple receivers 105. The reconstruction module 140 can include determining the polarizability measure (e.g., tensor) and localization of an object.

Polarizability can be characterized as a proportionality constant relating an object's far-field response to a primary filed that induced it. It can have units of volume, and can depend on the shape, permeability, and conductivity of the object, as well as the frequency of the applied field. In order to determine the polarizability, in some implementations, a best-fit algorithm can be utilized to implement a minimum residual matched filter.

The transmitter fields can be calculated from models of rectangular coils. The receiver fields can be calculated from dipole fields along the particular axis of the sensor, such that a 3-axis receiver node is treated like 3 independent and orthogonal dipoles.

In some implementations, image data from the sensor 125 can be used to further enforce the sparsity constraint beyond that supplied by a-priori knowledge of items or subjects that may occupy the OD 107. Specifically, an image of the OD 107 acquired by sensor 125 can be used to determine a spatial location of the target (e.g., which voxels of the OD 107 the target resides in and which voxels of the OD 107 are empty). Empty voxels contain no objects and therefore can be considered zero for compressed sensing (e.g., enabling better and/or quicker estimations of the solution to the underdetermined linear system).

In addition, an appropriate sized OD 107 can result in a scene that is sufficiently sparse for compressed sensing. For example, if an OD 107 is a volume that is 2 meters by 1 meter by 0.5 meters, and is divided into 8,000,000 voxels of 5 mm, a typical human located within this OD 107 would occupy only about 10% of the voxels at any moment (e.g., approximately 800,000 voxels). A retrieved set of polarizable objects from a sensor 125 can be used to determine three-dimensional surfaces within the OD 107 volume and consequently which voxels the individual resides in. The empty voxels can be forced to zeros when retrieving the set of polarizable objects while non-zeroed voxels can be altered during reconstruction (e.g., can be considered variables to find an optimal reconstructed solution to the underdetermined linear system).

Reconstruction module 140 can reconstruct one or more magnetic retrieved set of polarizable objects. In addition, reconstruction module 140 can create aggregate retrieved set of polarizable objects by combining multiple independent retrieved sets of polarizable objects. In some implementations, reconstruction module 140 can treat all receivers 105 as one large sparse aperture and reconstruct a single retrieved set of polarizable objects using the information acquired from all receivers 105 in the single aperture.

Reconstruction module 140 can perform localization of the object using multiple time-slices. Such an approach can use a single model-fitting approach that solves for the objects location (e.g., x, y, and t-crossing), speed, and polarizability tensor. An example localization approach is described more fully below.

Reconstruction module 140 can generate feature maps from the reconstructed images. Feature maps can include characterizations or features of the magnetic measurements. Statistical analysis can be performed across multiple images. Some example features include field magnitude, field phase, and polarizability tensor properties (discussed further below). Other features are possible.

Automatic threat recognition module 145 analyzes the images and/or feature maps for presence of threat objects. Threat objects can include dangerous items that an individual may conceal on their person, for example, firearms and explosives. Automatic threat recognition module 145 may identify threats using, for example, a classifier that assesses the feature maps generated by reconstruction module 140. The classifier may train on known threat features. In some implementations, the threat recognition process can compare the determined images to a library of predetermined polarizability signatures.

In some implementations, features (e.g., classification variables) can include field magnitude, phase, and polarizability tensor properties at one or more operating frequencies.

Rendering module 150 generates or renders an image characterizing the outcome of the threat recognition analysis performed by the threat recognition module 145. The image can be rendered on display 165. For example, rendering module 150 can illustrate an avatar of a scanned person and any identified threats. Rendering module 150 can illustrate a characterization that automatic threat recognition module 145 did not detect any threats.

Figure 2:
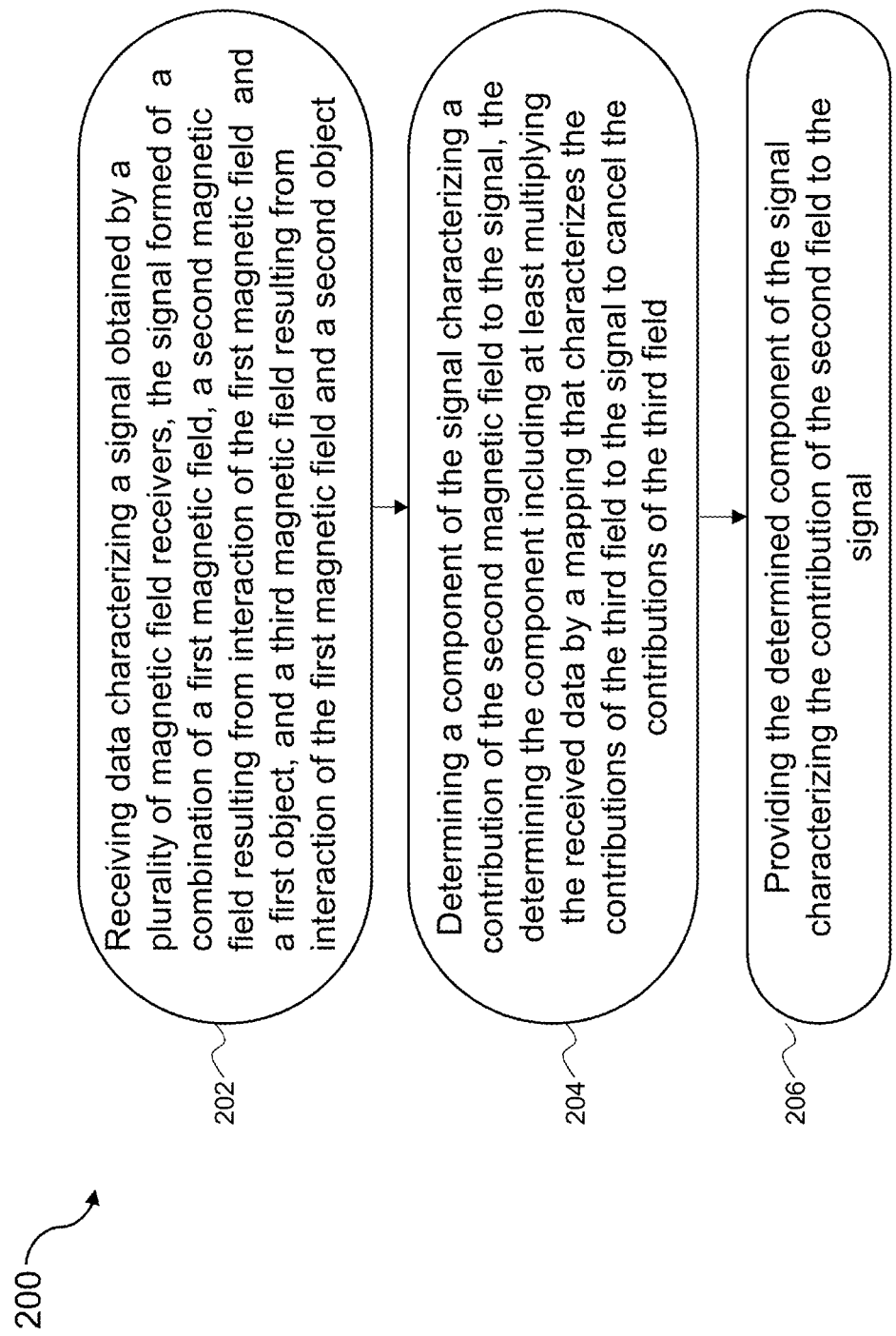
FIG. 2 is a process block diagram illustrating an example process for an example inspection system according to some aspects of the current subject matter.

FIG. 2 is a flowchart illustrating an exemplary method for suppressing external interference. At step 202, data characterizing a signal obtained by a plurality of magnetic field receivers can be received (e.g., magnetic receivers 105). The signal can be indicative of a combination of a first magnetic field (e.g., generated by transmitters 106), a second magnetic field resulting from interaction of the first magnetic field and a first object (e.g., target object 168 or a portion thereof), and a third magnetic signal resulting from interference (e.g., one or more of the interference objects or sensor motion 170a-c). For example, the third signal can result from (or be representative of) motion of receivers within the first magnetic field and/or an external magnetic field (e.g., other than the first magnetic field) that can be generated by an external source.

At step 204, a component of the signal characterizing a contribution of the second magnetic field (or target magnetic field from the target object 168) to the signal can be determined. The determining the component can include at least multiplying the received data by a mapping that characterizes the contributions of the third field (or the interference magnetic field from the interference object(s) 170a-c) to the signal to cancel the contributions of the third field.

In some implementations, the determining can be based on the dark measurement by the magnetic receivers 105 that can include performing magnetic field measurements of the environment of the inspection system that includes the inference object in the absence of the target object. For example, a first matrix (or a dark measurement matrix) can be calculated where each row can be indicative of magnetic field measurement by a magnetic receiver/sensor of the magnetic receivers 105 and each column can be indicative of a measurement time.

The determining can include transforming the received data characterizing the signal from a first basis to a second basis. The received data characterizing the signal can be a vector that can include various measurement values associated with detection of the target object (e.g., detected by the magnetic receivers 105 at various measurement times). The transformation can be achieved by multiplying the received signal data (e.g., in the vector form) by a second matrix. The second matrix can be calculated by singular value decomposition of the dark measurement matrix (e.g., see Equation 3 below). For example, the second matrix (e.g., matrix $(U^{(f)})^*$ in Equation 3) can include left singular vectors of the dark measurement matrix (e.g., matrix $d^{(f)}$ in Equation 3).

The determining can further include modifying the transformed data (e.g., product of vector of data received at step 202 and the second matrix) to generate modified data. In some implementations, generating the modified data can include cancelling portions of the transformed data that can be indicative of (or affected by) the external interference. This can be done, for example, by projecting the transformed data on one or more predetermined basis vectors indicative of magnetic field generated by the second object and cancelling (or removing) the projected components from the transformed data.

In some implementations, cancellations of the above-mentioned components of transformed data can be achieved by modifying the diagonal matrix obtained from the singular value decomposition of the dark measurement matrix (e.g., diagonal matrix $S^{(f)}$ in Equation 3 below), and multiplying the modified diagonal matrix (e.g., modified diagonal matrix $D_N$ in Equation 9 below) by the vector of the transformed data to generate a vector of modified data. In some implementations, the modified diagonal matrix can be calculated by replacing one or more singular values in the diagonal of the diagonal matrix (e.g., $S^{(f)}$) that are equal to or greater than a predetermined value with a zero; and by replacing one or more singular values in the diagonal of the diagonal matrix (e.g., $S^{(f)}$) that are less than the predetermined value with a one.

The modified data (e.g., vector of the transformed data) can be transformed back to the first basis from the second basis. This can be done, for example, by multiplying the vector of the modified data with a matrix $U^{(f)}$ (a conjugate of the matrix $(U^{(f)})^*$ described below). The process of transforming the measurement signal from the target object from the first basis to the second basis, modifying the transformed signal, and transforming the modified signal back to the first basis is illustrated in Equations 9-11 below.

In some implementations, properties of the target object (e.g., polarizability) can be related to the measurement of magnetic fields from the target object by a transfer matrix (e.g., $H^{(f)}$ described in Equation 12 below). A transfer matrix (e.g., $\tilde{H}$) in the second basis can be calculated from the transfer matrix in the first basis (e.g., $H^{(f)}$ (e.g., as described in Equation 14 below).

Figure 4:
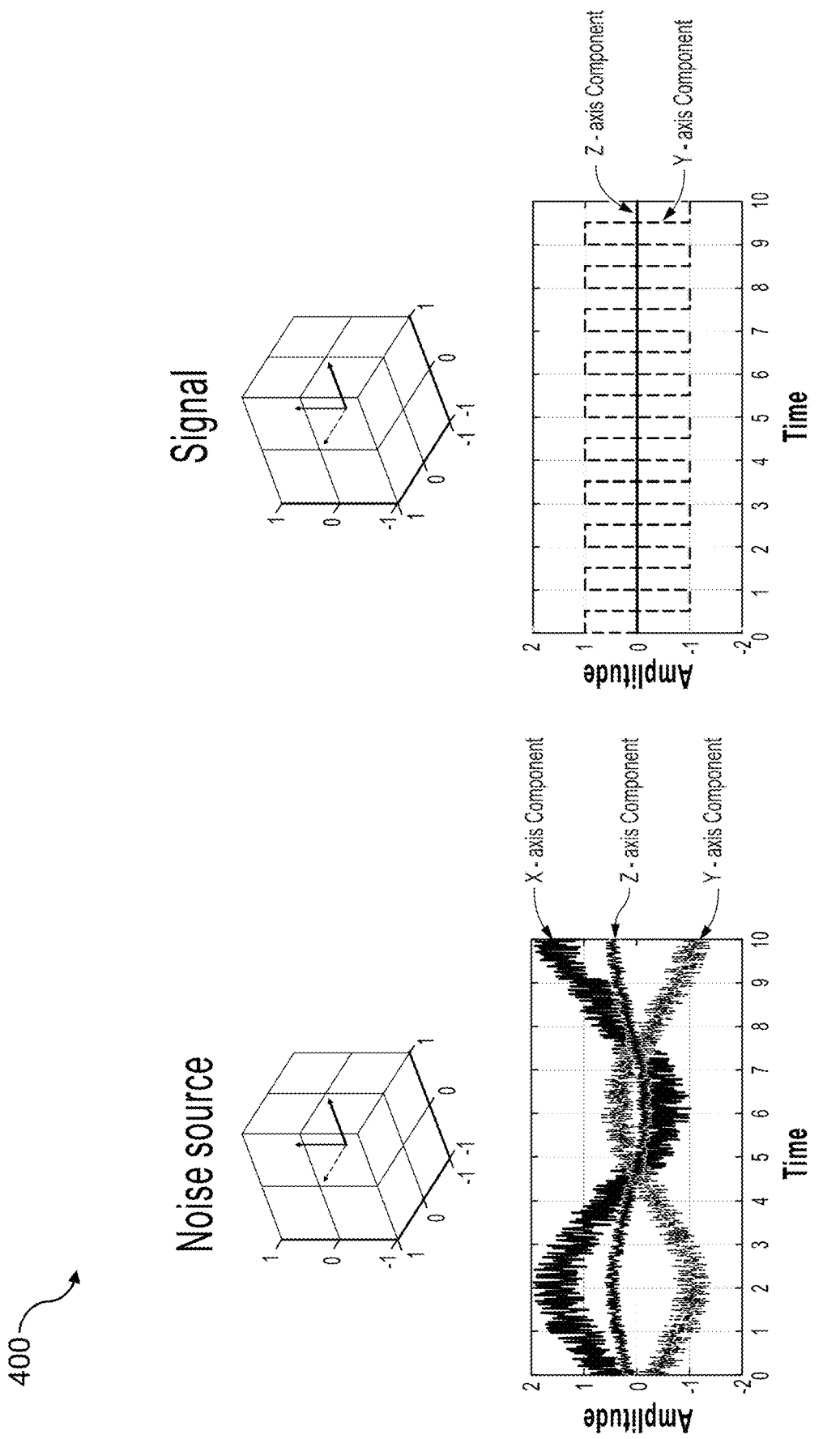
FIG. 4 illustrates an exemplary interference signal (left) and an exemplary measurement signal (right)
Figure 5:
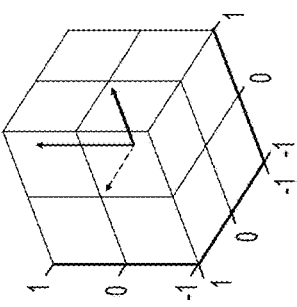
FIG. 5 illustrates a superposition signal (left) created by superposition of the interference signal and the measurement signal in FIG. 4 and a transformed superposition signal (right)
Figure 5:
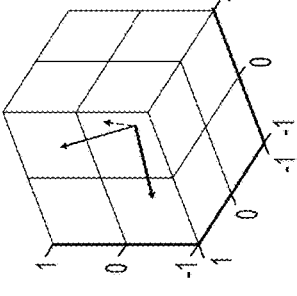
Figure 5:
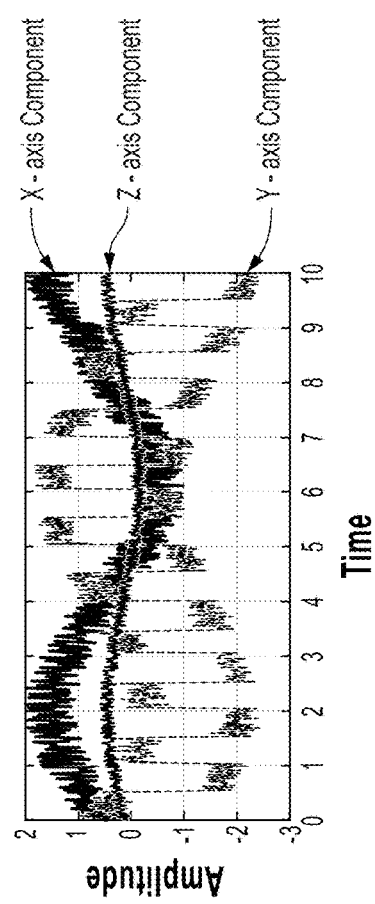
Figure 5:
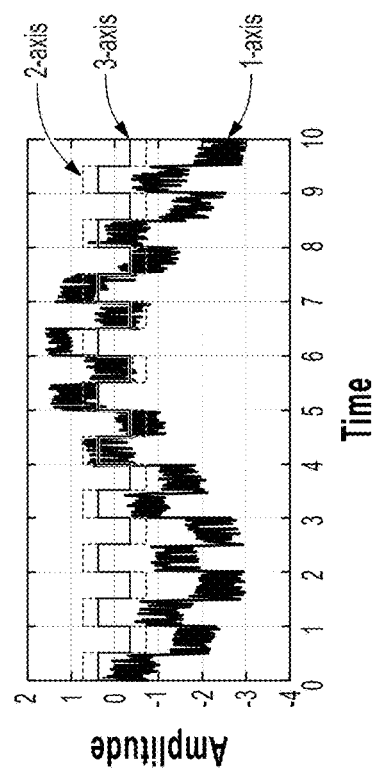

FIG. 4 illustrates an exemplary interference signal (left) and an exemplary target object signal (right). The interference signal has three components directed along the x-, the y- and the z-axis. The target object signal is directed along the y-axis. FIG. 5 illustrates a superposition signal (left) created by superposition of the interference signal and the measurement signal in FIG. 4 and a transformed superposition signal (right). The transformed superposition signal can be obtained by transforming the superposition signal from a first basis (x-, y-, z-axis) to a second basis (1-, 2-, 3-axis). After the transformation, noise from the interference signal primarily resides along the 1-axis.

Figure 6:
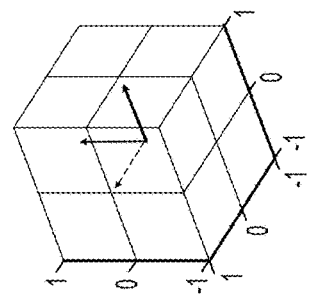
FIG. 6 illustrates an exemplary modified signal (left) calculated by cancelling portions of the interference signal from the transformed superposition signal in FIG. 5 and a second transformed signal (right) calculated by transforming the modified signal.
Figure 6:
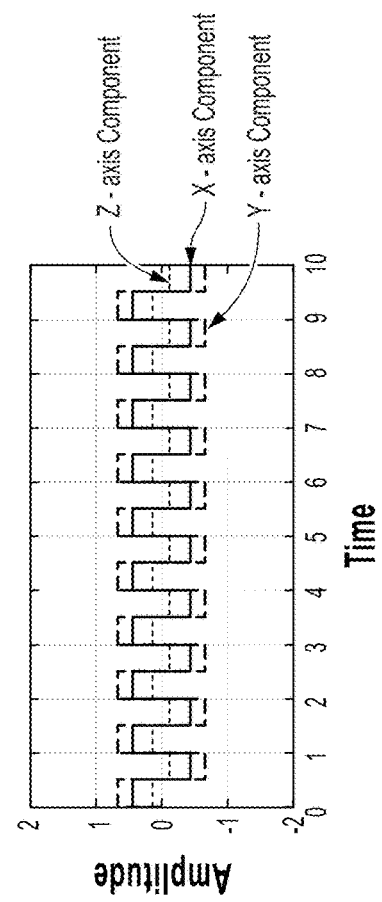
Figure 6:
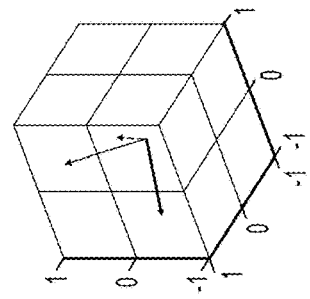
Figure 6:
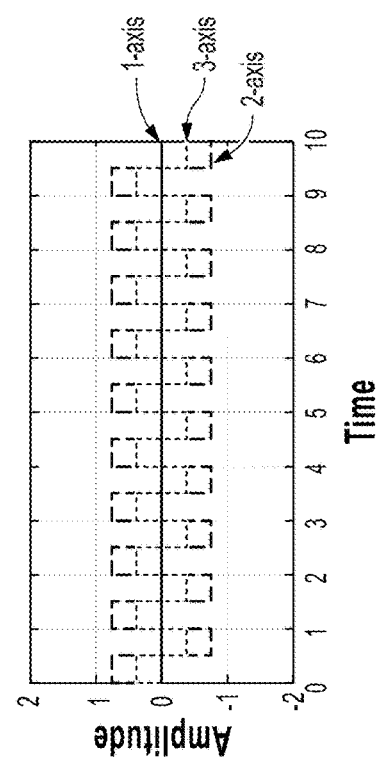

FIG. 6 illustrates an exemplary modified signal (left) calculated by cancelling portions of the interference signal from the transformed superposition signal in FIG. 5. For example, the interference signal residing along the 1-axis is cancelled. After cancellation of the 1-axis signal, the modified signal is transformed back to the first basis (second transformed signal). The second transformed signal is plotted in the right.

In some implementations, a time-varying magnetic field induced in the receivers by small displacement and/or rotations of receivers (e.g., magnetic receivers 105) can be identified and corrected. This can be done, for example, by performing a Taylor expansion of the measurement signal from the transmitters (e.g., assuming that the distance of the transmitter is much larger than the displacement of the magnetic receivers 105), and considering only the linear term (e.g., see Equation 16 below). The location and orientation of the magnetic receivers can be considered as a function of time. In some implementations, the freedom of motion of some subset of the receivers can be assumed to be limited to two (e.g., based on tilt of the receivers within a common mechanical structure with the structure's base in a fixed position). Based on these considerations, a measurement matrix (e.g., similar to dark measurement matrix described above) can be calculated and decomposed via singular value decomposition.

The following describes an example implementation.

The inspection system can encounter external sources of noise or interference in the real-world that obscure the signals from the actual objects under test. These sources can take on fairly arbitrary time-dependencies (e.g., when the source is stationary). For example, the current in a nearby power line may generate magnetic fields that can impinge on the inspection receivers. While the magnetic fields generated by the power line may be centered at 60 Hz (or 50 Hz in Europe), a variable load can induce side-lobes that fall into the bands of interest of the inspection system, and thus survive the various hardware and digital filters in the inspection systempost-processing architecture.

Assuming that both the system and some N interfering sources are not in motion relative to one another, the resulting fields at a given carrier frequency ($\omega f_j$ can be described as the product of a function with arbitrary spatial dependence ($\phi^{(f)}(\vec{x})$) and a function with arbitrary time-dependence ($\theta^{(f)}(\tau)$) for each independent interferer, Or $$\vec{B}_{int}^{(f)}(\vec{x},\tau) = \sum_{n=1}^{N}\vec{\phi}^{(f,n)}(\vec{x})\theta^{(f,n)}(\tau). \tag{1}$$

Figure 3:
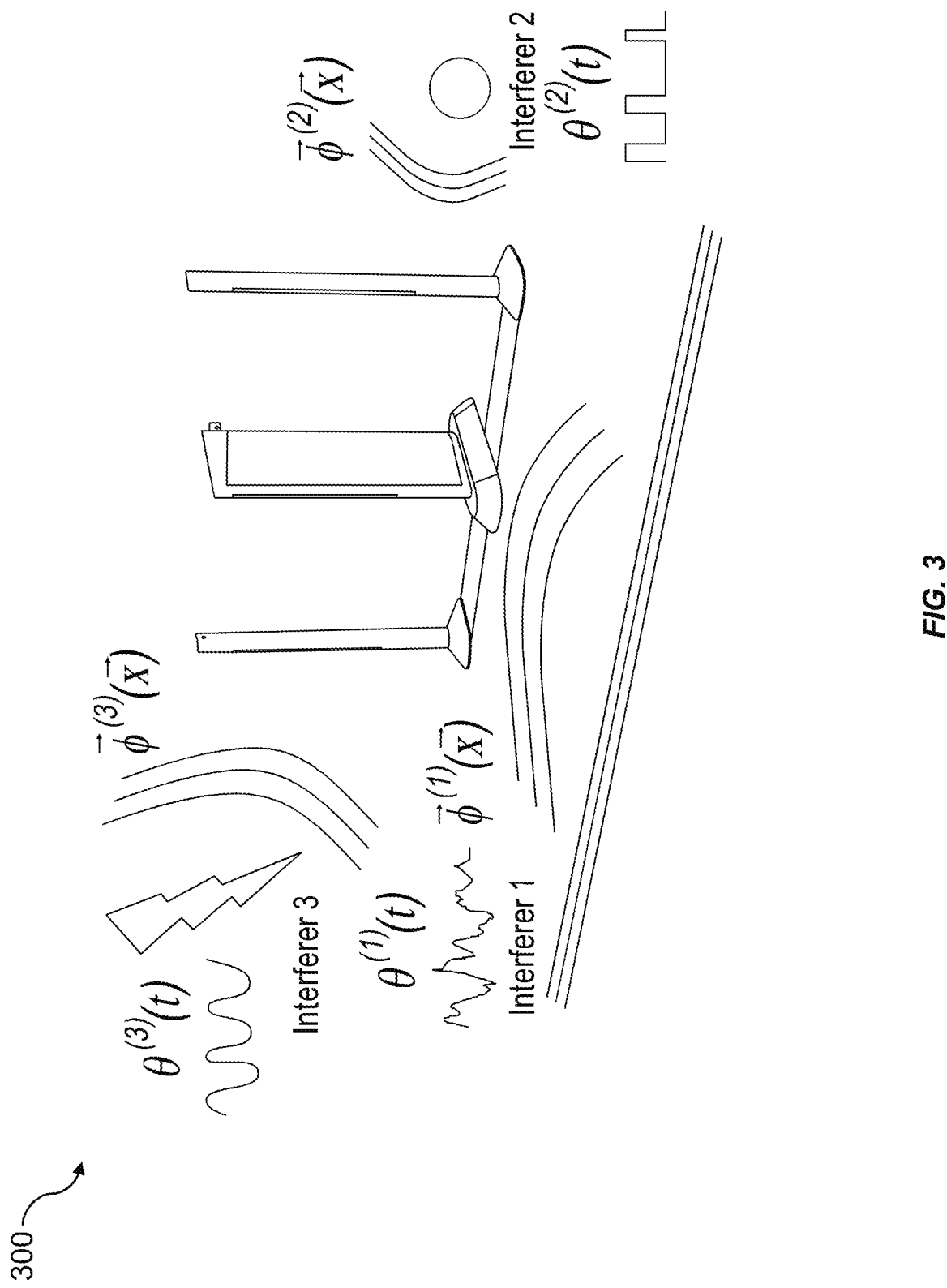
FIG. 3 is a diagram illustrating exemplary spatial and temporal interference from interference sources associated with an interference system.

See, for example, FIG. 3. Note that the interferer may not be physically small or localized, it only needs to be stationary. A dark measurement can be collected (e.g., a measurement where all internal transmissions are turned off and the only contribution is the external interference is collected). The scalar field quantity measured by a particular receiver at location $\vec{x}_i$ with orientation $\hat{n}_i$ at time $\tau_{t'}$, can be written as:

$$d_{i,t'}^{(f)} = \vec{B}_{int}^{(f)}(\vec{x}_i,\tau_{t'})\cdot\hat{n}_i = \sum_{n=1}^{N}\phi_i^{(f,n)}\theta_{t'}^{(f,n)}, \tag{2}$$

where $\phi_i^{(f,n)} = \vec{\phi}^{(f,n)}(\vec{x}_i)\cdot\hat{n}_i$.

With respect to characterization via singular value decomposition, the set of discrete field measurements collected by the system while 'dark' can be denoted by $d_{i,t'}^{(f)}=\vec{B}(\omega_f,\vec{x}_i,\tau_{t'})\cdot\hat{n}_i$ where i, f, t' are the labels for the receiver, frequency, and time-sample, respectively, that can be an arbitrary function of space, time, and frequency. However, a singular value decomposition (SVD) can be applied to a discrete set of field measurements (e.g., at each frequency) to help illuminate contributions that fit the form of Eq.(2). For example, each row of the measurement matrix $d^{(f)}$ can represent a distinct receiver and each column thereof can represent a distinct time-sample. The SVD then gives us $$d^{(f)}=U^{(f)}S^{(f)}(V^{(f)})^* \tag{3}$$

where $U^{(f)}$ is a unitary matrix containing the set of left-singular vectors, $V^{(f)}$ is a unitary matrix containing the set of right-singular vectors, and $S^{(f)}$ is a diagonal matrix whose entries are the real and non-negative singular values. Assuming that the only contributions to the measurement are from N independent, orthogonal, and static interferers, the elements of the singular decomposition can be directly related to the spatial and temporal modes of the interferers described by Eq. (2), such that $$\phi_i^{(f,n)}=U_{n,i}^{(f)} \tag{4}$$

$$\theta_{t'}^{(f,n)}=S_{n,n}^{(f)}V_{n,i}^{(f)} \tag{5}$$

and $S_{n,n}=0$ for n>N. For convenience in the following sections, the amplitude, represented by the singular value, have been incorporated into the definition of the temporal mode $\theta^{(f,n)}$, such that the spatial mode $\phi^{(f,n)}$ remains unitary.

The assumption that the interferers are orthogonal may not be necessary for the method to work, but may lead to a desirable physical interpretation of the modes recovered by SVD. If the interferers are in fact not orthogonal, then this method may find the fewest orthogonal modes capable of describing the entirety of the external interference, and the only part of this methodology that is invalidated is the one to-one mapping between the singular vectors and the interferers.

With respect to estimation and subtraction via inner product, the previous characterization can be used to remove the contributions from external interference in a future measurement where the transmitters are turned on. It can be desirable to extract $a_{i,t}^{(f)}$ (the measurement of the object under test), or something close to it, given an actual measurement that contains the additional contribution from the external interferers:

$$g_{i,t}^{(f)}=a_{i,t}^{(f)}+\vec{B}_{int}^{(f)}(\vec{x}_i,\tau_i)\cdot\hat{n}_i. \tag{6}$$

The index t here and t' in the previous section have been used to make it clear that these measurements are from different time-periods (t>t' for all t, t'). As such, the time-dependence previously characterized for the interferers may not be assumed to have any correlation beyond the time-interval over which it was collected. However, the spatial dependence may be time-invariant. Thus, the interference can be considered as the product of an unknown time dependence and a known spatial dependence:

$$g_{i,t}^{(f)} = a_{i,t}^{(f)} + \sum_{n=1}^{N}\theta_t^{(f,n)}\phi_i^{(f,n)}. \tag{7}$$

Interferer's present temporal dependence can be recovered by applying our known spatial modes to the measured data via an inner product, or $$\tilde{\theta}_t^{(f)} = \sum_i (\phi_i^{(f,n)})^* g_{i,t}^{(f)} \qquad (8)$$
$$= \sum_i (\phi_i^{(f,n)})^* a_{i,t}^{(f)} + \sum_i (\phi_i^{(f,n)})^* d_{i,t}^{(f)},.$$
$$= \sum_i (\phi_i^{(f,n)})^* a_{i,t}^{(f)} + \theta_t^{(f,n)}$$

In this way, the time-dependence of the interferer can be recovered. In some implementations, a term involving the desired measurement can be left behind. If the spatial modes of the desired measurements and the interferer are quite different (e.g., nearly orthogonal), then this first term can approach zero, and $\tilde{\theta}_t^{(f)} \approx \theta_t^{(f)}$. An interference-free quantity related to the desired measurement, $\tilde{a}^{(f)}$ can be defined as:

$$\tilde{g}_{i,t}^{(f)} = g_{i,t}^{(f)} - \sum_{n=1}^{N} \phi_i^{(f,n)} \tilde{\theta}_t^{(f,n)}, \qquad (9)$$
$$= g_{i,t}^{(f)} - \sum_{n=1}^{N} \left( \phi_i^{(f,n)} \sum_i (\phi_i^{(f,n)})^* g_{i,t}^{(f)} \right).$$
$$= a_{i,t}^{(f)} - \sum_{n=1}^{N} \left( \phi_i^{(f,n)} \sum_i (\phi_i^{(f,n)})^* a_{i,t}^{(f)} \right)$$

The last line (where the interference term has vanished) can be represented in the following matrix form:

$$\tilde{g}^{(f)} = \left( I - \sum_{n=1}^{N} \phi^{(f,n)} (\phi^{(f,n)})^* \right) g^{(f)}, \qquad (10)$$

or in the SVD notation, $$\tilde{g}^{(f)} = (I - U^{(f)} D_N (U^{(f)})^*) g^{(f)} = (I - U^{(f)} D_N (U^{(f)})^*) a^{(f)}, \qquad (11)$$

where I is the identity matrix and $D_N$ is a diagonal matrix where $D_{n,n}=1$ for $0 \le n \le N$, and $D_{n,n}=0$ for $n>N$. Assuming that the measurements of the object under test $(a^{(f)})$ is modeled by a transfer matrix $(H^{(f)})$ times some description of the object $(\alpha^{(f)})$, such that $$a_{i,t}^{(f)} = \sum_u H_{i,t,u}^{(f)} \alpha_u, \qquad (12)$$

then the transformation of Eq. (9) can be incorporated into a new effective transfer matrix:

$$\tilde{g}_{i,t}^{(f)} = \sum_u \tilde{H}_{i,t,u}^{(f)} \alpha_u, \qquad (13)$$

where $$\tilde{H}_{i,t,u}^{(f)} = H_{i,t,u}^{(f)} - \sum_{n=1}^{N} \left( \phi_i^{(f,n)} \sum_i (\phi_i^{(f,n)})^* H_{i,t,u}^{(f)} \right). \qquad (14)$$

This form can make the operation explicit: the null-space of the system's transfer matrix can be expanded to include the spatial modes of the external interferers. In other words, in some implementations, the transfer matrix has been modified such that no amount of signal from the identified interferer's can produce a result in the effective measurement vector.

If the original transfer matrix is assumed to have a rank of K, then the effective transfer matrix's rank cam be reduced such that $(K-N) \le \overline{K} \le K$ In real-world scenarios, the number of significant interferers can be much smaller than the number of measurements collected. In addition, the interferers can be expected to be external to the system, often at distances far greater than the physical dimensions of the system. Given that objects of interest can be internal to the system (and thus are characterized by very different spatial variations), the practical application of this method can be expected to yield suppression of interference with a small or negligible rank reduction.

Addition of regularizers can improve upon any loss in transfer matrix rank. In effect, combining this procedure with regularization can allow for usage of reasonable priors to fill in any potential information gaps after cutting out potentially noisy measurements.

With respect to application to motion-induced signals, the method described here can be applied to any unwanted signal that can be characterized by a collection of time-invariant spatial modes. In this section, this method has been applied to the example of small displacements/rotations of the sensors within the primary field. For signal induced by coordinated motion of multiple sensors, the physical housing can be tilted or swayed when exposed to wind. When the sensors move (and/or rotate) in a non uniform primary field, their sampling of the primary field at different points in space over time can result in a dynamic signal of equal or greater magnitude than the desired secondary fields. This may be problematic for algorithms consuming this data. In some implementations, if the displacement is assumed to be small relative to the distance to the primary field source, the signal can be expanded using Taylor expansion to include the linear term (e.g., the product of the displacement and the derivative of the primary field with respect to this displacement). By comparison to the previous sections, displacement as a function of time can play the role of the $\theta(\tau)$, the field gradient can play the role of $\vec{\phi}(\vec{x})$, and the number of modes can be equal to the number of degrees of freedom of motion in the system. Formally, the location $(\vec{x}_i)$ and orientation $(\hat{n}_i)$ of the $i^{th}$ sensor can be considered as functions of time, and describe the signal induced by the sensor motion as:

$$m_{i,t'}^{(f)} = \left( \vec{B}_p^{(f)} (\vec{x}_i(\tau_{t'})) \right) \cdot \hat{n}_i(\tau_{t'}) - \left( \vec{B}_p^{(f)} (\vec{x}_i(\tau_0)) \right) \cdot \hat{n}_i(\tau_0) \qquad (15)$$

$$\approx \sum_{m=1}^{M} \psi_m(\tau_{t'}) \left[ \frac{\partial}{\partial \psi_m} \left[ (\vec{B}_p^{(f)} (\vec{x}_i(\psi_1, \psi_2, \dots))) \cdot \hat{n}_i(\psi_1, \psi_2, \dots) \right] |_{\psi_1, \dots, \psi_M = 0} \right], \qquad (16)$$

where $\vec{B}_p^{(f)}(\vec{x})$ is the primary field as a function of space, $\tau_0$ represents some moment in time when the system was at baseline, and $\psi_m$ represents displacement along one of the M possible motion 'modes' of the system. Taking the example of a tower that houses some number of sensors, the motion can be a tilt of the tower with the base in a fixed position, which can lead to two degrees of freedom. Thus, the temporal modes can be proportional to two orthogonal tilt angles, and the spatial modes can be proportional to the derivative of the primary field with respect to these tilt angles, or $$\theta_{i'}^{(f,m)} \propto \psi_m(\tau_{i'}), \tag{17}$$

$$\phi_i^{(f,m)}(\vec{x}) \propto \frac{\partial}{\partial \psi_m} \left[ \left( \vec{B}^{(f)}(\vec{x}_i(\psi_1, \psi_2)) \right) \cdot \hat{n}_i(\psi_1, \psi_2) \right] |_{\psi_{1,2}=0}, \tag{18}$$

where $\psi_m$ (m ∈ 1, 2) describe two orthogonal tilt angles, and $x_i(\psi1, \psi2)$ and $\hat{n}_i(\psi1, \psi2)$ are the location and unit-normal, respectively, of the $i^{th}$ sensor parameterized by tilt angle. If a reasonable model of the primary field exists, these spatial modes can be pre calculated. In some implementations, to ensure orthonormality of the spatial modes (e.g., which may not be guaranteed by orthogonality of the tilt angles), a measurement matrix can be assembled and decomposed via SVD, using the resulting singular vectors as in the procedure of the previous sections.

In some implementations, if the field gradients or the precise nature of the motion are unknown, then the modes can be characterized empirically (e.g., as in the case of the external interferers). For example, assuming no other signals are present, the system can be put into random motion for a period of time in order to measure $m^{(f)}$, which can contain independent contributions from the various motion modes. Using this motion measurement in the place of the dark measurement, $d^{(f)}$, the procedure outlined in the previous sections can be followed identically. The method can be effective if the nature of the characterized motion encompasses the sorts of motion experienced in live operation. If the system were equipped with the means of automatically perturbing its own position, this could form an automated site-specific calibration routine analogous to that described below for external interference. In some implementations, in order to use this method to suppress external interference and motion-induced signals simultaneously, all modes can be orthogonal. This can be accomplished by characterizing the modes serially (e.g., characterizing the modes of one nature first, and then applying the resulting transformation to the data before characterizing the modes of the second nature).

The preceding example method of external interference characterization and suppression can be implemented with the following example. Before screening starts, the system should collect a 'dark' measurement, or a measurement with the transmitting coils powered off. The data collected is then analyzed via SVD at each frequency. The spatial distributions ($\phi^{(f,n)}$) of significant external sources (e.g., singular vectors whose singular values are above some threshold) are stored.

The transfer matrix is modified according to Eq. (14) and stored, along with its pseudo-inverse. During live operation, data collected is transformed according to Eq.(9) before polarizability retrieval is performed.

Even though the spatial modes of the interferers and actual objects passing through the system might be very different, they may not be expected (nor required) to be orthogonal. Thus, this procedure can have a noticeable effect on the data measured in normal operation. Two aspects of some implementations include: 1) that the modification is linear and 2) that the transfer matrix used during inversion/retrieval can be modified like the modification of the data. For these reasons, the predictive power of the model may not be diminished by the interference suppression. Thresholding external sources can be based on the singular values, since these represent the amplitude of the interference (albeit at the time of characterization). Some other metrics can be introduced related to potential transfer matrix rank reduction to avoid including interferer modes that may considerably impair performance. Formally, the safest modes to remove can satisfy $$\left\| \sum_i (\phi_i^{(f,n)})^* H_{i,t,u}^{(f)} \right\|_2 \approx 0. \tag{19}$$

Slow spatial variation may be a reasonable proxy, as in the case of interferers far from the system. Some of the proposed implementations may require the interferers to be present when the dark measurement is collected. Intermittent interferers can present a problem to this method. A complementary routine that periodically monitors for new interferers and recommends new dark measurements may be required for more complete coverage. Moving the system (or the interference sources) can destroy the relevance of the recorded spatial modes, and the procedure can then be repeated. Nearby inspection systems that are turned on when the dark measurement is collected can be identified as interferers.

Although a few variations have been described in detail above, other modifications or additions are possible. For example, the number of receivers may not be limited and some implementations may include any number of receivers. The transmitters are not limited to a particular frequency, for example, coils with different properties (operating frequencies, locations, and the like) can be used. Different reconstruction algorithms may be used and different features may be used for threat detection.

Without in any way limiting the scope, interpretation, or application of the claims appearing below, a technical effect of one or more of the example implementations disclosed herein may include one or more of the following, for example, some example implementations of the current subject matter can perform threat detection and discrimination in high clutter environments in which individuals may be carrying personal items such as cell phones and laptops and without personal item divestment. In some implementations, a personnel inspection system can perform threat detection and discrimination with high throughput that allows individuals to pass through the metal detector at normal walking speeds such that individuals are not required to slow down for inspection and, in some implementations, the inspection threshold can allow for multiple individuals to pass through the threshold side-by-side (e.g., two or more abreast). In some configurations, individuals walking in near proximity can be screened, thereby eliminating the need for screened individuals to remain stationary during the screening process.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
receiving, by a data processor of an inspection system configured to detect a target object undergoing inspection, data characterizing a signal obtained by a plurality of magnetic field receivers of the inspection system, the signal formed of a combination of a first magnetic field, a second magnetic field resulting from interaction of the first magnetic field and the target object passing through the plurality of magnetic field receivers, and a third magnetic field resulting from motion of receivers within the first magnetic field and/or an external magnetic field other than the first magnetic field, the external magnetic field generated by an external source;
determining, by the data processor, a component of the signal characterizing a contribution of the second magnetic field to the signal, wherein determining the component includes canceling contributions of the third magnetic field to the signal by at least mapping the contributions of the third magnetic field to the signal, the determining further comprising:
 transforming the received data characterizing the signal from a first basis to a second basis,
 modifying the transformed data to generate modified data by at least cancelling portions of the transformed data corresponding to projections of the transformed data on a predetermined basis vector indicative of the external magnetic field generated by the external source,
 transforming the modified data from the second basis to the first basis,
 calculating a first matrix indicative of magnetic field measurements associated with magnetic fields generated by the external source in the absence of the first magnetic field, and
 performing singular value decomposition on the first matrix to generate a second matrix comprising a plurality of left singular vectors of the first matrix and a third matrix including singular values associated with the first matrix in the diagonal of the third matrix; and
controlling, by the data processor, at least one magnetic field transmitter of the inspection system to dynamically generate a modified first magnetic field corresponding to the target object based on the determined component of the signal characterizing the contribution of the second magnetic field to the signal, wherein the controlling includes adjusting at least one of an amplitude and a frequency of the modified first magnetic field with respect to the first magnetic field.

2. The method of claim 1, wherein transforming the received data from the first basis to the second basis includes multiplying the received data by the second matrix.

3. The method of claim 2, further comprising generating a fourth matrix by at least setting a first singular value in the diagonal of the third matrix that is equal to or greater than a predetermined value to a zero, and by setting a second singular value in the diagonal of the third matrix that is less than the predetermined value to a one,
wherein a first left singular vector of the plurality of left singular vectors is associated with the first singular value, and
wherein the predetermined basis vector indicative of magnetic field generated by the external source includes the first left singular vector.

4. The method of claim 3, wherein modifying the transformed data includes multiplying the result of the multiplication between the received data and the second matrix with the fourth matrix.

5. The method of claim 4, wherein transforming the modified data from the second basis to the first basis includes multiplying the modified data with the transpose of the second matrix.

6. The method of claim 1, further comprising calculating a polarizability index of the target object from the determined component of the signal characterizing the contribution of the second field to the signal, the polarizability index characterizing a magnetic polarizability property of the target object.

7. The method of claim 1, further comprising:
calculating a fifth matrix indicative of magnetic field measurements resulting from rotation of one or more of the plurality of magnetic field receivers about a predetermined axis,
wherein a matrix element of the fifth matrix associated with a first magnetic field receiver is calculated by at least multiplying an angular displacement of the first magnetic field receiver with a predetermined expansion of a mode of the first magnetic field receiver associated with the angular displacement.

8. The method of claim 1, wherein the external source is a stationary interference object.

9. A system comprising:
a plurality of magnetic field receivers;
at least one magnetic field transmitter;
at least one data processor communicatively coupled to the plurality of magnetic field receivers and the at least one magnetic field transmitter and configured to detect a target object undergoing inspection, and;
a memory coupled to the at least one data processor, the memory storing instructions to cause the at least one data processor to perform operations comprising:
receiving data characterizing a signal obtained by a plurality of magnetic field receivers, the signal formed of a combination of a first magnetic field, a second magnetic field resulting from interaction of the first magnetic field and the target object passing through the plurality of magnetic field receivers, and a third magnetic field resulting from motion of receivers within the first magnetic field and/or an external magnetic field other than the first magnetic field, the external magnetic field generated by an external source;
determining a component of the signal characterizing a contribution of the second magnetic field to the signal, wherein determining the component includes canceling contributions of the third magnetic field to the signal by at least mapping the contributions of the third magnetic field to the signal, the determining further comprising:
transforming the received data characterizing the signal from a first basis to a second basis,
modifying the transformed data to generate modified data by at least cancelling portions of the transformed data corresponding to projections of the transformed data on a predetermined basis vector indicative of the external magnetic field generated by the external source,
transforming the modified data from the second basis to the first basis,
calculating a first matrix indicative of magnetic field measurements associated with magnetic fields generated by the external source in the absence of the first magnetic field, and
performing singular value decomposition on the first matrix to generate a second matrix comprising a plurality of left singular vectors of the first matrix and a third matrix including singular values associated with the first matrix in the diagonal of the third matrix; and
controlling the at least one magnetic field transmitter to dynamically generate a modified first magnetic field corresponding to the target object based on the determined component of the signal characterizing the contribution of the second magnetic field to the signal, wherein the controlling includes adjusting at least one of an amplitude and a frequency of the modified first magnetic field with respect to the first magnetic field.

10. The system of claim 9, wherein transforming the received data from the first basis to the second basis includes multiplying the received data by the second matrix.

11. The system of claim 10, wherein the operations further comprising generating a fourth matrix by at least setting a first singular value in the diagonal of the third matrix that is equal to or greater than a predetermined value to a zero, and by setting a second singular value in the diagonal of the third matrix that is less than the predetermined value to a one,
wherein a first left singular vector of the plurality of left singular vectors is associated with the first singular value, and
wherein the predetermined basis vector indicative of magnetic field generated by the external source includes the first left singular vector.

12. The system of claim 11, wherein modifying the transformed data includes multiplying the result of the multiplication between the received data and the second matrix with the fourth matrix.

13. The system of claim 12, wherein transforming the modified data from the second basis to the first basis includes multiplying the modified data with the transpose of the second matrix.

14. The system of claim 9, wherein the operations further comprising calculating a polarizability index of the target object from the determined component of the signal characterizing the contribution of the second field to the signal, the polarizability index characterizing a magnetic polarizability property of the target object.

15. The system of claim 9, wherein the operations further comprising:
calculating a fifth matrix indicative of magnetic field measurements resulting from rotation of one or more of the plurality of magnetic field receivers about a predetermined axis,
wherein a matrix element of the fifth matrix associated with a first magnetic field receiver is calculated by at least multiplying an angular displacement of the first magnetic field receiver with a predetermined expansion of a mode of the first magnetic field receiver associated with the angular displacement.

16. A non-transitory computer readable medium comprising non-transitory machine-readable instructions that, when executed by at least one programmable processor that comprises at least one physical core and a plurality of logical cores, cause the at least one programmable processor to perform operations comprising:
receiving data characterizing a signal obtained by a plurality of magnetic field receivers of an inspection system configured to detect a target object undergoing inspection, the signal formed of a combination of a first magnetic field, a second magnetic field resulting from interaction of the first magnetic field and the target object, and a third magnetic field resulting from motion of receivers within the first magnetic field and/or an external magnetic field other than the first magnetic field, the external magnetic field generated by an external source;
determining a component of the signal characterizing a contribution of the second magnetic field to the signal, wherein determining the component includes cancelling contributions of the third magnetic field to the signal by at least mapping the contributions of the third magnetic field to the signal, the determining further comprising:
transforming the received data characterizing the signal from a first basis to a second basis,
modifying the transformed data to generate modified data by at least cancelling portions of the transformed data corresponding to projections of the transformed data on a predetermined basis vector indicative of the external magnetic field generated by the external source,
transforming the modified data from the second basis to the first basis,
calculating a first matrix indicative of magnetic field measurements associated with magnetic fields generated by the external source in the absence of the first magnetic field, and
performing singular value decomposition on the first matrix to generate a second matrix comprising a plurality of left singular vectors of the first matrix and a third matrix including singular values associated with the first matrix in the diagonal of the third matrix; and
controlling at least one magnetic field transmitter of the inspection system to dynamically generate a modified first magnetic field corresponding to the target object based on the determined component of the signal characterizing the contribution of the second magnetic field to the signal, wherein the controlling includes adjusting at least one of an amplitude and a frequency of the modified first magnetic field with respect to the first magnetic field.

* * * * *